US011836991B2

(12) United States Patent
Furuya

(10) Patent No.: US 11,836,991 B2
(45) Date of Patent: Dec. 5, 2023

(54) IMAGE PROCESSING APPARATUS AND IMAGE PROCESSING METHOD

(71) Applicant: SUBARU CORPORATION, Tokyo (JP)

(72) Inventor: Takahiro Furuya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 136 days.

(21) Appl. No.: 17/485,915

(22) Filed: Sep. 27, 2021

(65) Prior Publication Data

US 2022/0101026 A1  Mar. 31, 2022

(30) Foreign Application Priority Data

Sep. 30, 2020  (JP) ................................. 2020-165192

(51) Int. Cl.
*G06V 20/58* (2022.01)
(52) U.S. Cl.
CPC .................. *G06V 20/584* (2022.01)
(58) Field of Classification Search
CPC .. G06V 20/584; G06V 20/588; G06V 20/582; G06V 20/64; G06V 10/25; G06V 20/647; G06V 10/147; G06V 10/255; G06V 10/56; G06V 10/82; G06V 20/56; G06V 40/172; G08G 1/07; G08G 1/0175; G08G 1/166; G08G 1/095; G08G 1/09623; G08G 1/0125; G08G 1/0133; G08G 1/20; G08G 1/087; G08G 1/08; G08G 1/0104; G08G 1/123; G08G 1/09; G08G 1/0112; G08G 1/096775; G08G 1/017; G08G 1/00; G08G 1/0116; G08G 1/097; G08G 9/00; H04W 4/40; H04W 4/44; H04W 4/023; H04W 4/025; H04W 4/06; H04W 4/026;
(Continued)

(56) References Cited

U.S. PATENT DOCUMENTS

2004/0066315 A1\* 4/2004 Szulanski ............... G08G 1/123
340/994
2005/0265256 A1\* 12/2005 Delaney .................. H04L 41/12
370/254
(Continued)

FOREIGN PATENT DOCUMENTS

JP  2010-141517 A  6/2010

*Primary Examiner* — Nimesh Patel
(74) *Attorney, Agent, or Firm* — TROUTMAN PEPPER HAMILTON SANDERS LLP

(57) ABSTRACT

An image processing apparatus includes a detector, a grouping processor, a management unit, and a determination unit. The detector detects traffic signals on the basis of a captured image. The grouping processor performs a grouping process of causing each of the detected traffic signals to belong to any one of groups. The management unit manages a location and display information of the each of the detected traffic signals in association with the group to which the each of the traffic signals belongs, and thereby manages the traffic signals. The determination unit determines, for each of the groups, a representative location and representative display information of one or more traffic signals belonging to relevant one of the groups, among the traffic signals, on the basis of the location and display information of each of the one or more traffic signals belonging to the relevant one of the groups.

20 Claims, 10 Drawing Sheets

(58) Field of Classification Search
CPC .... H04W 4/46; H04W 84/18; B60R 21/0134; B60R 25/10; B60R 1/005; B60R 1/10; B60R 2001/1223
See application file for complete search history.

(56) References Cited

U.S. PATENT DOCUMENTS

| 2006/0125655 | A1* | 6/2006 | McMahon | G08G 1/096872 |
| | | | | 340/907 |
| 2016/0318490 | A1* | 11/2016 | Ben Shalom | B60W 30/18154 |
| 2017/0262709 | A1* | 9/2017 | Wellington | G06V 10/764 |

* cited by examiner

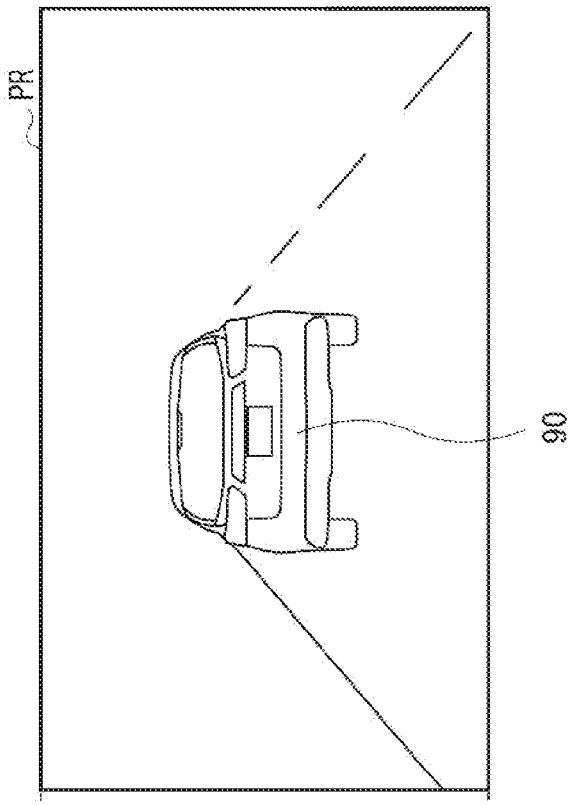
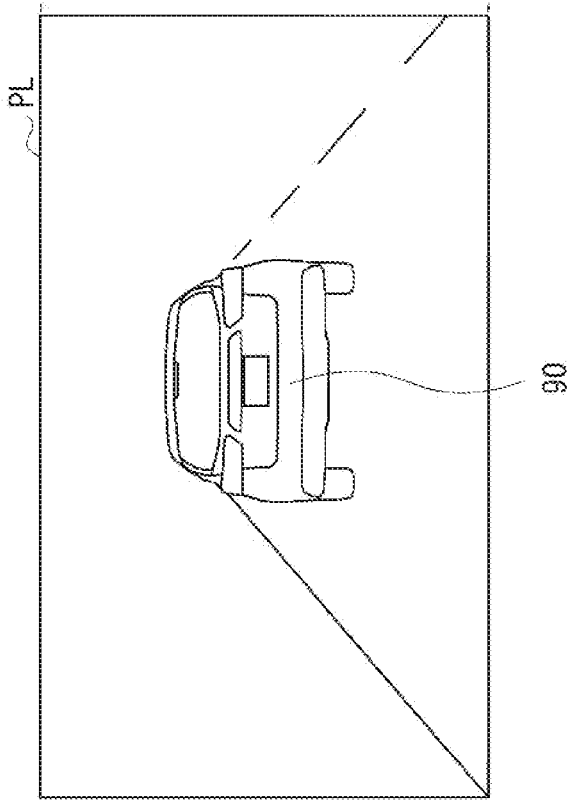

IMAGE PROCESSING APPARATUS AND IMAGE PROCESSING METHOD

CROSS-REFERENCE TO RELATED APPLICATION

The present application claims priority from Japanese Patent Application No. 2020-165192 filed on Sep. 30, 2020, the entire contents of which are hereby incorporated by reference.

BACKGROUND

The technology relates to an image processing apparatus and an image processing method that analyze an image of a traffic signal included in a captured image.

Some image processing apparatuses to be mounted on vehicles such as automobiles are configured to identify display information of traffic signals on the basis of captured images obtained by image sensors. For example, reference is made to Japanese Unexamined Patent Application Publication No. 2010-141517.

SUMMARY

An aspect of the technology provides an image processing apparatus including a detector, a grouping processor, a management unit, and a determination unit. The detector is configured to detect traffic signals on the basis of a captured image. The grouping processor is configured to perform a grouping process of causing each of the traffic signals detected by the detector to belong to any one of groups. The management unit is configured to manage a location and display information of the each of the traffic signals detected by the detector in association with any one of the groups to which the each of the traffic signals belongs, and to thereby manage the traffic signals. The determination unit is configured to determine, for each of the groups, a representative location and representative display information of one or more traffic signals that belong to relevant one of the groups, among the traffic signals, on the basis of the location and the display information of each of the one or more traffic signals which belong to the relevant one of the groups.

An aspect of the technology provides an image processing method. The image processing method includes detecting traffic signals on the basis of a captured image. The image processing method includes performing a grouping process of causing each of the traffic signals detected to belong to any one of groups. The image processing method includes managing the traffic signals, by managing a location and display information of the each of the traffic signals detected in association with any one of the groups to which the each of the traffic signal belongs. The image processing method includes determining, for each of the groups, a representative location and representative display information of one or more traffic signals that belong to relevant one of the groups, among the traffic signals, on the basis of the location and the display information of each of the one or more traffic signals which belong to the relevant one of the groups.

An aspect of the technology provides an image processing apparatus including circuitry. The circuitry is configured to detect traffic signals on the basis of a captured image. The circuitry is configured to perform a grouping process of causing each of the traffic signals detected to belong to any one of groups. The circuitry is configured to manage the traffic signals, by managing a location and display information of the each of the traffic signals detected in association with any one of the groups to which the each of the traffic signal belongs. The circuitry is configured to determine, for each of the groups, a representative location and representative display information of one or more traffic signals that belong to relevant one of the groups, among the traffic signals, on the basis of the location and the display information of each of the one or more traffic signals which belong to the relevant one of the groups.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIG. 2A and FIG. 2B are each an explanatory diagram illustrating an example of a stereo image illustrated in FIG. 1.

DETAILED DESCRIPTION

A captured image may sometimes include images of a plurality of traffic signals. It is desired that an image processing apparatus appropriately obtain display information of the plurality of traffic signals even in such a case.

It is desirable to provide an image processing apparatus and an image processing method that make it possible to appropriately obtain display information of a plurality of traffic signals.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
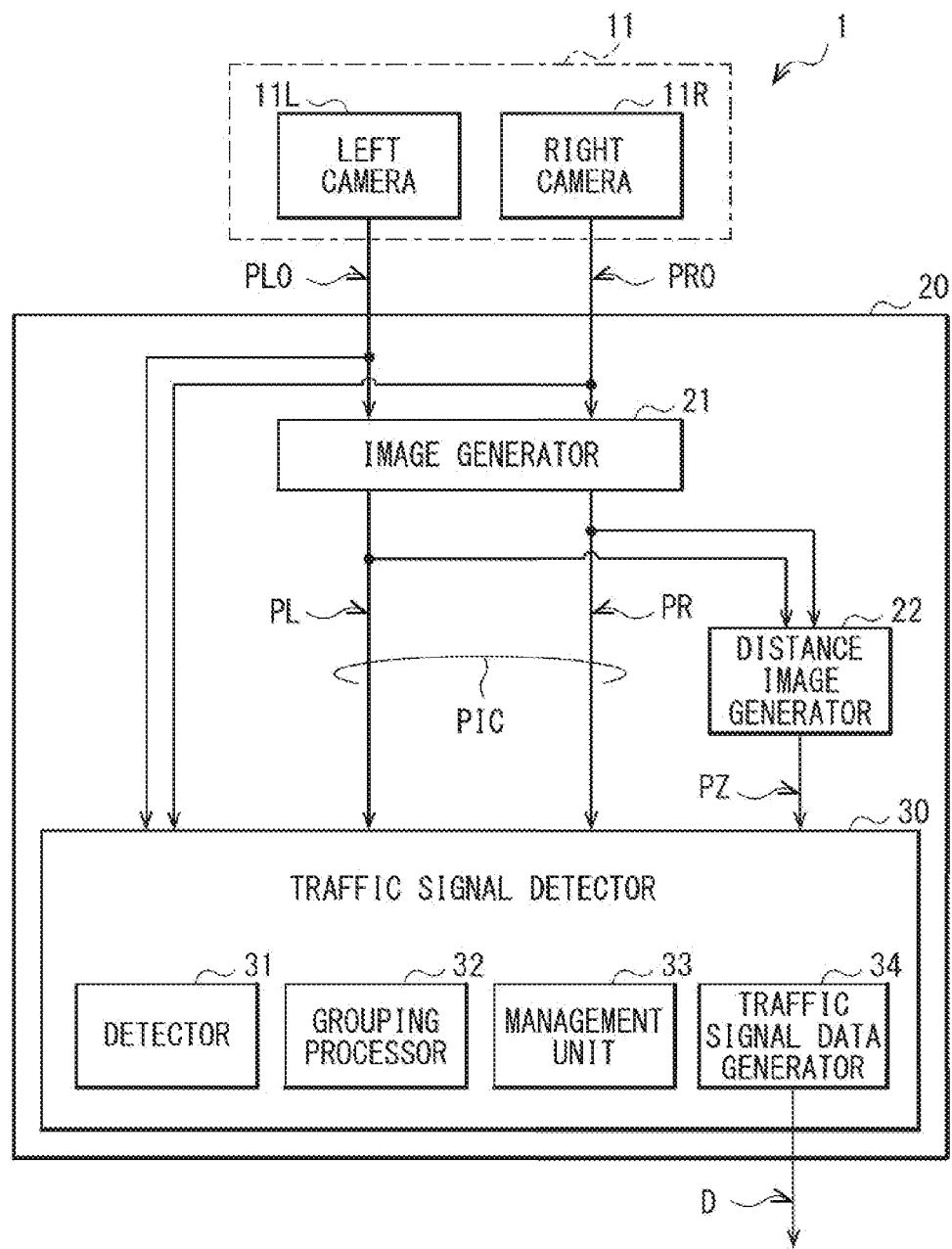
FIG. 1 is a block diagram illustrating a configuration example of an image processing apparatus according to one example embodiment of the technology.

FIG. 1 illustrates a configuration example of an image processing apparatus 1 according to an example embodiment of the technology. An image processing method according an example embodiment of the technology is embodied through the present example embodiment, and is thus described in conjunction with the present example embodiment. The image processing apparatus 1 may include a stereo camera 11 and a processor 20. The image processing apparatus 1 may be mounted on a vehicle 10 such as an automobile.

The stereo camera 11 may capture images of an environment ahead of the vehicle 10 to thereby generate a pair of images. The pair of images may be a left image PL0 and a right image PR0 having different parallaxes. The stereo camera 11 may include a left camera 11L and a right camera 11R. The left camera 11L and the right camera 11R may include respective lenses and respective image sensors. In this example, the left camera 11L and the right camera 11R may be disposed in the vicinity of an inner upper part of the front windshield of the vehicle 10 and spaced from each other by a predetermined distance in the width direction of the vehicle 10. The left camera 11L and the right camera 11R may perform imaging operations in synchronization with each other. The left camera 11L may generate the left image PL0, and the right camera 11R may generate the right image PR0. The left image PL0 and the right image PR0 may be so-called Bayer images. The stereo camera 11 may perform the imaging operation at a predetermined frame rate, such as 60 fps, to generate the left image PL0 and the right image PR0, and may supply the left image PL0 and the right image PR0 to the processor 20.

The processor 20 illustrated in FIG. 1 may recognize the environment ahead of the vehicle 10 on the basis of the left image PL0 and the right image PR0 supplied from the stereo camera 11. On the basis of data related to, for example, a traffic signal TS recognized by the processor 20, display information of the traffic signal TS may be displayed on a console monitor in the vehicle 10 or a sound corresponding to the display information may be generated in the vehicle 10 to thereby provide the driver with the information related to the traffic signal TS. Further, on the basis of the display information of the traffic signal TS, a traveling control apparatus (not illustrated) in the vehicle 10 may perform a braking control on the vehicle 10. The processor 20 may include, for example, a central processing unit (CPU) that executes programs, a random access memory (RAM) that temporarily stores processing data, and a read only memory (ROM) that stores programs. The processor 20 may include an image generator 21, a distance image generator 22, and a traffic signal detector 30.

The image generator 21 may perform a development process or an affine transformation on the basis of the left image PL0 and the right image PR0, which may be Bayer images, to thereby generate a stereo image PIC including a left image PL and a right image PR. End parts of the left image PL0 and the right image PR0, which may be Bayer images, can undergo image distortion attributable to a lens, for example. The image generator 21 may thus cut out an image region from the left image PL0 excluding its end part to thereby generate the left image PL, and cut out an image region from the right image PR0 excluding its end part to thereby generate the right image PR.

FIG. 2 illustrates an example of the stereo image PIC. FIG. 2A illustrates an example of the left image PL, and FIG. 2B illustrates an example of the right image PR. In this example, a preceding vehicle 90 is traveling ahead of the vehicle 10 on a road on which the vehicle 10 is traveling. The left camera 11L may capture an image of the preceding vehicle 90 to generate the left image PL. The right camera 11R may capture an image of the preceding vehicle 90 to generate the right image PR. The stereo camera 11 may generate the stereo image PIC including the left image PL and the right image PR as described above.

The distance image generator 22 may generate a distance image PZ by performing predetermined image processing, including a stereo matching process and a filtering process, on the basis of the left image PL and the right image PR included in the stereo image PIC. The distance image generator 22 may perform the stereo matching process by identifying, on the basis of the left image PL and the right image PR, corresponding points including two image points correlated with each other. A pixel value of each pixel in the distance image PZ may be a parallax value. The parallax value may be, for example, a difference between a coordinate value on a horizontal axis (i.e., an X-axis in FIG. 2) of an image point on the left image PL and a coordinate value on the horizontal axis of an image point on the right image PR. The parallax value may correspond to a distance value to a point corresponding to each pixel in a three-dimensional real space. Note that this is a non-limiting example. Alternatively, for example, the pixel values may be distance values indicating distances to points corresponding to the respective pixels in the three-dimensional real space. The distance image generator 22 may supply the generated distance image PZ to the traffic signal detector 30.

The traffic signal detector 30 may detect a traffic signal TS provided at an intersection, on the basis of the left images PL0 and PL, the right images PR0 and PR, and the distance image PZ, and thereby generate traffic signal data D indicating the location and display information of the traffic signal TS. The traffic signal detector 30 may include a detector 31, a grouping processor 32, a management unit 33, and a traffic signal data generator 34.

The detector 31 may detect the traffic signal TS on the basis of the left images PL0 and PL, the right images PR0 and PR, and the distance image PZ. For example, on the basis of the left image PL and the right image PR, the detector 31 may recognize the traffic signal TS and obtain the display information of the traffic signal TS. The display information of the traffic signal TS may include, for example, information on the displayed color, i.e., red, green, or yellow, and information on an arrow indicating straight traveling, left turn, or right turn. The detector 31 may thereafter obtain the distance to the traffic signal TS on the basis of the distance image PZ.

For example, in a case where the image of the traffic signal TS goes out of the left image PL and the right image PR due to traveling of the vehicle 10, the detector 31 may obtain the display information of the traffic signal TS on the basis of the left image PL0 and the right image PR0, which may be Bayer images. For example, the detector 31 may identify a coordinate location of the traffic signal TS in the left image PL0 and the right image PR0 by performing an inverse transformation of the affine transformation on the basis of a coordinate location of the traffic signal TS previously detected in the left image PL and the right image PR, and thereby obtain the display information of the traffic signal TS. The detector 31 may thereafter estimate a distance to the traffic signal TS on the basis of a distance to the traffic signal TS previously obtained on the basis of the distance image PZ and data related to the traveling speed of the vehicle 10 supplied from the traveling control apparatus (not illustrated) of the vehicle 10, for example.

Thereafter, for example, in a case where the image of the traffic signal TS goes out of the left image PL0 and the right image PR0, which may be Bayer images, due to further traveling of the vehicle 10, the detector 31 may estimate a distance to the traffic signal TS on the basis of the previously obtained distance to the traffic signal TS and the data related to the traveling speed of the vehicle 10.

In such a manner, the detector 31 may detect the location and display information of the traffic signal TS on the basis of the left images PL0 and PL, the right images PR0 and PR, and the distance image PZ. In a case where there is a plurality of traffic signals TS ahead of the vehicle 10, the detector 31 may detect the location and display information of each of the traffic signals TS.

The grouping processor 32 performs a grouping process of causing the traffic signal TS detected by the detector 31 to belong to any one of a plurality of groups G (in this example, two groups G1 and G2). For example, the grouping processor 32 may perform the grouping process to cause one or more traffic signals TS located at one intersection to belong to the same one of the groups G. Whether a plurality of traffic signals TS is located at one intersection is determinable by, for example, confirming whether the traffic signals TS are located within a predetermined distance (e.g., 60 meters) from each other. The grouping processor 32 performs the grouping process in such a manner.

The management unit 33 manages the distance to the traffic signal TS detected by the detector 31 and the display information of the traffic signal TS in association with the group G to which the traffic signal TS belongs, and thereby manages a plurality of traffic signals TS.

For each of the groups G, the traffic signal data generator 34 determines a representative distance D1 and representative display information D2 of relevant one of the groups G on the basis of the distance to each of one or more traffic signals TS that belong to the relevant one of the groups G and the display information of each of the one or more traffic signals TS that belong to the relevant one of the groups G. In a case where a single traffic signal TS belongs to one of the groups G, the representative distance D1 of the one of the groups G may be the distance to that single traffic signal TS, and the representative display information D2 of the one of the groups G may be the display information of that single traffic signal TS. In a case where a plurality of traffic signals TS belongs to one of the groups G, the representative distance D1 of the one of the groups G may be, in this example, a distance to one traffic signal TS that is ahead of the vehicle 10 and is closest to the vehicle 10, among the traffic signals TS that belong to the one of the groups G. The representative display information D2 of the one of the groups G may be, in this example, display information of one traffic signal TS that is closest to the vehicle 10 and whose image is included in the left images PL0 and PL and the right images PR0 and PR, among the traffic signals TS that belong to the one of the groups G. The traffic signal data generator 34 may thereafter generate traffic signal data D including data related to the representative distance D1 and the representative display information D2 of each of the groups G and output the traffic signal data D.

On the basis of the traffic signal data D, it is thus possible to provide information related to the traffic signal TS to the driver in the vehicle 10 by, for example, displaying the display information of the traffic signal TS on the console monitor or generating a sound corresponding to the display information. Further, in the vehicle 10, it is possible for the traveling control apparatus (not illustrated) to perform a braking control on the vehicle 10, for example, on the basis of the traffic signal data D. The representative distance D1 and the representative display information D2 are obtained for each of the plurality of groups G that may correspond to a plurality of intersections, for example. This makes it possible for the vehicle 10 to appropriately obtain the display information of a plurality of traffic signals.

In one embodiment, the detector 31 may serve as a "detector". In one embodiment, the left images PL0 and PL and the right images PR and PR may each serve as a "captured image". In one embodiment, the grouping processor 32 may serve as a "grouping processor". In one embodiment, each of the groups G may serve as a "group". In one embodiment, the management unit 33 may serve as a "management unit". In one embodiment, the traffic signal data generator 34 may serve as a "determination unit". In one embodiment, the representative distance D1 may serve as a "representative location". In one embodiment, the representative display information D2 may serve as "representative display information".

Example workings and effects of the image processing apparatus 1 according to the present example embodiment will now be described.

First, an outline of an overall operation of the image processing apparatus 1 will be described with reference to FIG. 1. The stereo camera 11 may capture images of the environment ahead of the vehicle 10 to generate the left image PL0 and the right image PR0, which may be Bayer images. The image generator 21 may perform a development process or an affine transformation on the basis of the left image PL0 and the right image PR0 to thereby generate the stereo image PIC including the left image PL and the right image PR. The distance image generator 22 may generate the distance image PZ by performing predetermined image processing, including the stereo matching process and the filtering process, on the basis of the left image PL and the right image PR included in the stereo image PIC. The traffic signal detector 30 may detect a traffic signal TS provided at an intersection, on the basis of the left images PL0 and PL, the right images PR0 and PR, and the distance image PZ, and thereby generate the traffic signal data D indicating the location and display information of the traffic signal TS.

In the traffic signal detector 30, the detector 31 detects a traffic signal TS on the basis of the left images PL0 and PL, the right images PR0 and PR, and the distance image PZ. The grouping processor 32 performs the grouping process of causing the traffic signal TS detected by the detector 31 to belong to any one of a plurality of groups G (in this example, two groups G1 and G2). The management unit 33 manages the distance to the traffic signal TS detected by the detector 31 and the display information of the traffic signal TS in association with any one of the groups G to which the traffic signal TS belongs, and thereby manages a plurality of traffic signals TS. The traffic signal data generator 34 determines, for each of the groups G, the representative distance D1 and the representative display information D2 of relevant one of the groups G on the basis of the distance to each of one or more traffic signals TS that belong to the relevant one of groups G, and the display information of each of the one or more traffic signals TS that belong to the relevant one of groups G. The traffic signal data generator 34 may thereafter generate the traffic signal data D including data related to the representative distance D1 and the representative display information D2 of each of the groups G and output the traffic signal data D.

Figure 3:
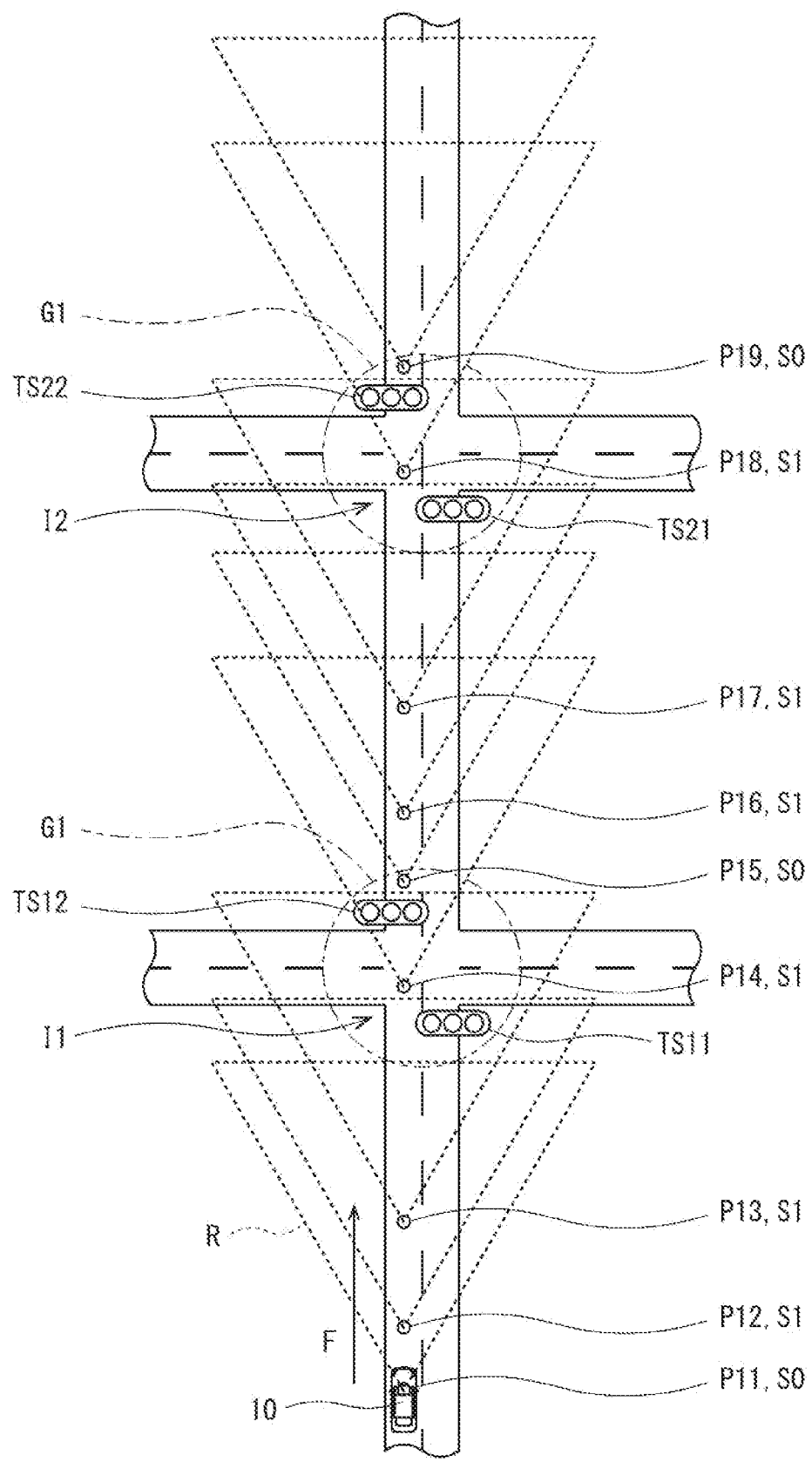
FIG. 3 is an explanatory diagram illustrating an operation example of a traffic signal detector illustrated in FIG. 1.

FIG. 3 illustrates an operation example of the traffic signal detector 30. The vehicle 10 may be traveling on a traveling road in a traveling direction F. On this traveling road, there are intersections I1 and I2 ahead of the vehicle 10. Two traffic signals TS11 and TS12 are provided at the intersection I1. Two traffic signals TS21 and TS22 are provided at the intersection I2. The vehicle 10 may move through locations P11, P12, P13, . . . in this order on such a traveling road. Dashed triangles represent respective imaging ranges R at the locations P within which the stereo camera 11 of the vehicle 10 is able to capture images.

The management unit 33 of the traffic signal detector 30 manages the distance to each traffic signal TS detected by the detector 31 and the display information of the traffic signal TS in association with the group G to which the traffic signal TS belongs. The management unit 33 may take the following five management states, i.e., management states S0, S1, S2, S12, and S21.

1) Management state S0: a state where there is no group G to which any traffic signal TS belongs.
2) Management state S1: a state where the group G1 is the only group G to which one or more traffic signals TS belong.
3) Management state S2: a state where the group G2 is the only group G to which one or more traffic signals TS belong.
4) Management state S12: a state where one or more traffic signals TS belong to each of the group G1 and the group G2, and the one or more traffic signals TS that belong to the group G1 are closer to the vehicle 10 than the one or more traffic signals TS that belong to the group G2.
5) Management state S21: a state where one or more traffic signals TS belong to each of the group G1 and the group G2, and the one or more traffic signals TS that belong to the group G2 are closer to the vehicle 10 than the one or more traffic signals TS that belong to the group G1.

FIG. 3 also illustrates these management states S.

When the vehicle 10 is at the location P11, no traffic signal TS is included in the imaging range R. The grouping processor 32 may thus refrain from performing the grouping process, causing any traffic signal TS to belong to neither of the groups G1 and G2. In this case, the management state S is at S0.

When the vehicle 10 comes to the location P12, the traffic signal TS11 at the intersection I1 becomes included in the imaging range R. The grouping processor 32 may cause the traffic signal TS11 to belong to the group G1. This results in a state where the traffic signal TS11 belongs to the group G1 and no traffic signal TS belongs to the group G2, causing the management state S to change to S1.

When the vehicle 10 comes to the location P13, the traffic signal TS12 newly enters the imaging range R, causing the imaging range R to include the two traffic signals TS11 and TS12. The traffic signal TS12 is located at the intersection I1 at which the traffic signal TS11 is provided. The grouping processor 32 may thus cause the traffic signal TS12 to belong to the group G1 to which the traffic signal TS11 belongs. This results in a state where the traffic signals TS11 and TS12 belong to the group G1 and no traffic signal TS belongs to the group G2, causing the management state S to remain at S1.

When the vehicle 10 comes to a location P14, the traffic signal TS11 goes out of the imaging range R, and only the traffic signal TS12 remains in the imaging range R. Because the vehicle 10 has not yet reached the location of the traffic signal TS12, the state where the two traffic signals TS11 and TS12 belong to the group G1 remains unchanged. Because the traffic signals TS11 and TS12 belong to the group G1 and no traffic signal TS belongs to the group G2, the management state S remains at S1.

When the vehicle 10 comes to a location P15, the traffic signal TS12 goes out of the imaging range R. The management unit 33 may exclude the two traffic signals TS11 and TS12 from the group G1 because the vehicle 10 has passed through the location of the traffic signal TS12. This causes the two traffic signals TS11 and TS12 to fall outside the scope of management by the management unit 33. As a result, the group G1 has no traffic signal TS belonging thereto. Because any traffic signal TS belongs to neither of the groups G1 and G2, the management state S changes to S0.

When the vehicle 10 comes to a location P16, the traffic signal TS21 at the intersection I2 becomes included in the imaging range R. The grouping processor 32 may cause the traffic signal TS21 to belong to the group G1. This results in a state where the traffic signal TS21 belongs to the group G1 and no traffic signal TS belongs to the group G2, causing the management state S to change to S1.

When the vehicle 10 comes to a location P17, the traffic signal TS22 newly enters the imaging range R, causing the imaging range R to include the two traffic signals TS21 and TS22. The traffic signal TS22 is located at the intersection I2 at which the traffic signal TS21 is provided. The grouping processor 32 may thus cause the traffic signal TS22 to belong to the group G1 to which the traffic signal TS21 belongs. This results in a state where the traffic signals TS21 and TS22 belong to the group G1 and no traffic signal TS belongs to the group G2, causing the management state S to remain at S1.

When the vehicle 10 comes to a location P18, the traffic signal TS21 goes out of the imaging range R, and only the traffic signal TS22 remains in the imaging range R. Because the vehicle 10 has not yet reached the location of the traffic signal TS22, the state where the two traffic signals TS21 and TS22 belong to the group G1 remains unchanged. Because the traffic signals TS21 and TS22 belong to the group G1 and no traffic signal TS belongs to the group G2, the management state S remains at S1.

When the vehicle 10 comes to a location P19, the traffic signal TS22 goes out of the imaging range R. The management unit 33 may exclude the two traffic signals TS21 and TS22 from the group G1 because the vehicle 10 has passed through the location of the traffic signal TS22. This causes the two traffic signals TS21 and TS22 to fall outside the scope of management by the management unit 33. As a result, the group G1 has no traffic signal TS belonging thereto. Because any traffic signal TS belongs to neither of the groups G1 and G2, the management state changes to S0.

In such a manner, the grouping processor 32 may select either one of the group G1 and the group G2, and cause one or more traffic signals TS located at one intersection to belong to the selected group G. Further, in a case where the vehicle 10 has passed through the locations of all of the one or more traffic signals TS provided at the one intersection, the management unit 33 may exclude the one or more traffic signals TS from the group G. In this example, the grouping processor 32 may cause the traffic signals TS11 and TS12 located at the intersection I1 and the traffic signals TS21 and TS22 located at the intersection I2 to belong to the group G1; however, this is non-limiting, and these traffic signals TS may be caused to belong to the group G2. In such a case, the management state S is at S2 at the locations P12 to P14 and at the locations P16 to P18.

Figure 4:
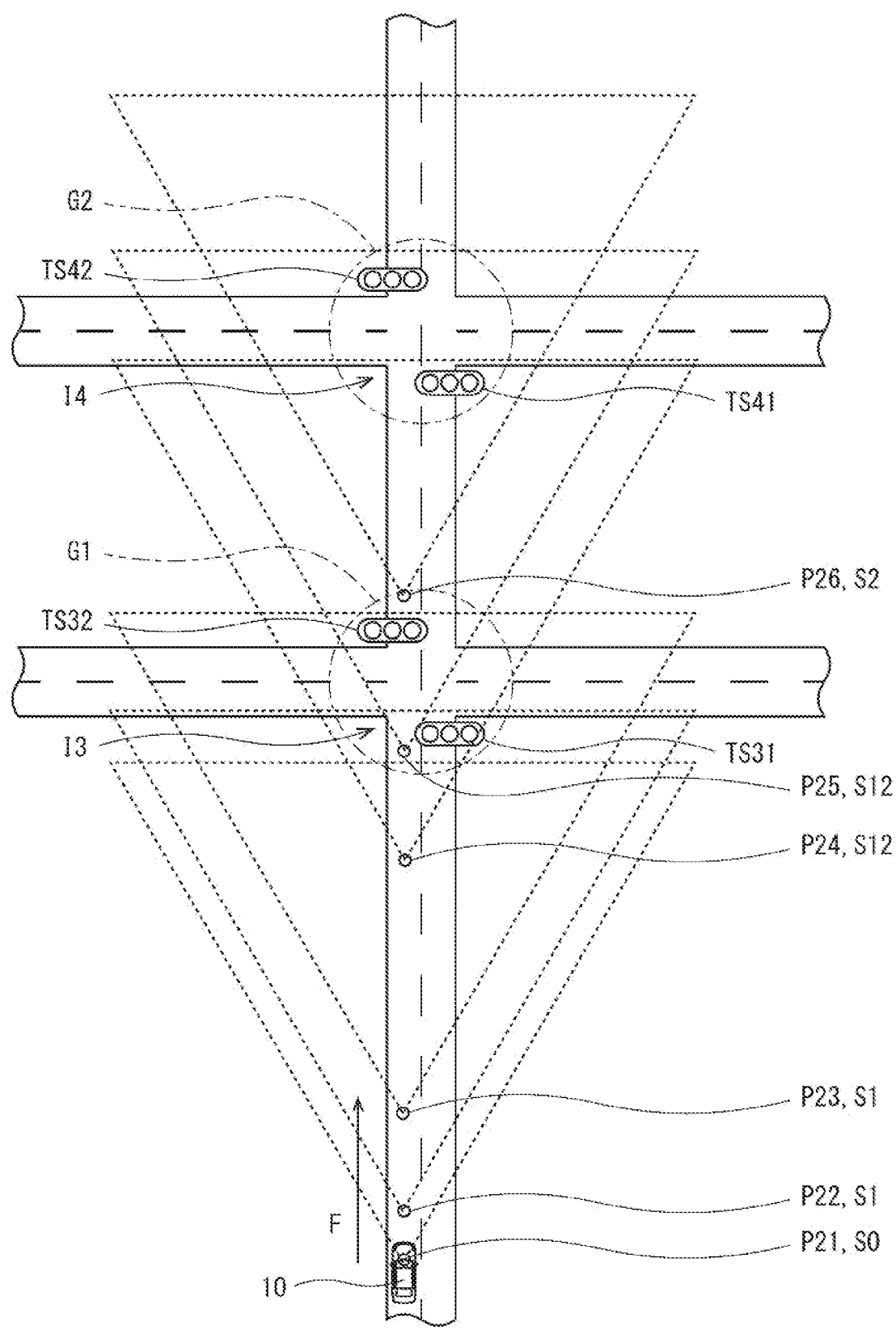
FIG. 4 is an explanatory diagram illustrating another operation example of the traffic signal detector illustrated in FIG. 1.

FIG. 4 illustrates another operation example of the traffic signal detector 30. On the traveling road, there are intersections I3 and I4 ahead of the vehicle 10. Two traffic signals TS31 and TS32 are provided at the intersection I3, and two traffic signals TS41 and TS42 are provided at the intersection I4.

Locations P21 to P23 are similar to the locations P11 to P13 in FIG. 3. When the vehicle 10 is at the location P23, the two traffic signals TS31 and TS32 are included in the imaging range R. Because these traffic signals TS31 and TS32 are located at the same intersection I3, the grouping processor 32 may cause the traffic signals TS31 and TS32 to belong to the group G1. The traffic signals TS31 and TS32 belong to the group G1 and no traffic signal TS belongs to the group G2. The management state is thus at S1.

When the vehicle 10 comes to a location P24, the traffic signal TS41 provided at the intersection I4 subsequent to the intersection I3 enters the imaging range R. As a result, the imaging range R includes the two traffic signals TS31 and TS32 provided at the intersection I3 and the traffic signal TS41 provided at the intersection I4. The traffic signal TS41 is located at the intersection I4 different from the intersection I3 at which the traffic signals TS31 and TS32 are provided. No traffic signal TS belongs to the group G2. The grouping processor 32 may thus cause the traffic signal TS41 to belong to the group G2 different from the group G1 to which the traffic signals TS31 and TS32 belong. This results in a state where the traffic signals TS31 and TS32 belong to the group G1 and the traffic signal TS41 belongs to the group G2. The traffic signals TS31 and TS32 that belong to the group G1 are closer to the vehicle 10 than the traffic signal TS41 that belongs to the group G2. The management state thus changes to S12.

When the vehicle 10 comes to a location P25, the traffic signal TS42 provided at the intersection I4 enters the imaging range R, and the traffic signal TS31 provided at the intersection I3 goes out of the imaging range R. As a result, the imaging range R includes the traffic signal TS32 provided at the intersection I3 and the traffic signals TS41 and TS42 provided at the intersection I4. The traffic signal TS42 is located at the intersection I4 at which the traffic signal TS41 is provided. The grouping processor 32 may thus cause the traffic signal TS42 to belong to the group G2 to which the traffic signal TS41 belongs. This results in a state where the traffic signals TS31 and TS32 belong to the group G1 and the traffic signals TS41 and TS42 belong to the group G2, causing the management state S to remain at S12.

When the vehicle 10 comes to a location P26, the traffic signal TS32 goes out of the imaging range R. The management unit 33 may exclude the two traffic signals TS31 and TS32 from the group G1 because the vehicle 10 has passed through the location of the traffic signal TS32. This causes the two traffic signals TS31 and TS32 to fall outside the scope of management by the management unit 33. As a result, no traffic signal TS belongs to the group G1 and the traffic signals TS41 and TS42 belong to the group G2. The management state S thus changes to S2.

In such a manner, the grouping processor 32 may cause the respective traffic signals TS located at the intersections I3 and I4 different from each other to belong to the groups G1 and G2 different from each other. In the example of FIG. 4, the grouping processor 32 may cause the traffic signals TS31 and TS32 located at the intersection I3 to belong to the group G1, and cause the traffic signals TS41 and TS42 located at the intersection I4 to belong to the group G2; however, this is non-limiting. Alternatively, for example, the grouping processor 32 may cause the traffic signals TS31 and TS32 located at the intersection I3 to belong to the group G2, and cause the traffic signals TS41 and TS42 located at the intersection I4 to belong to the group G1. In this case, the management state S is: at S2 at the locations P22 and P23; at S21 at the locations P24 and P25; and at S1 at the location P26.

Figure 5:
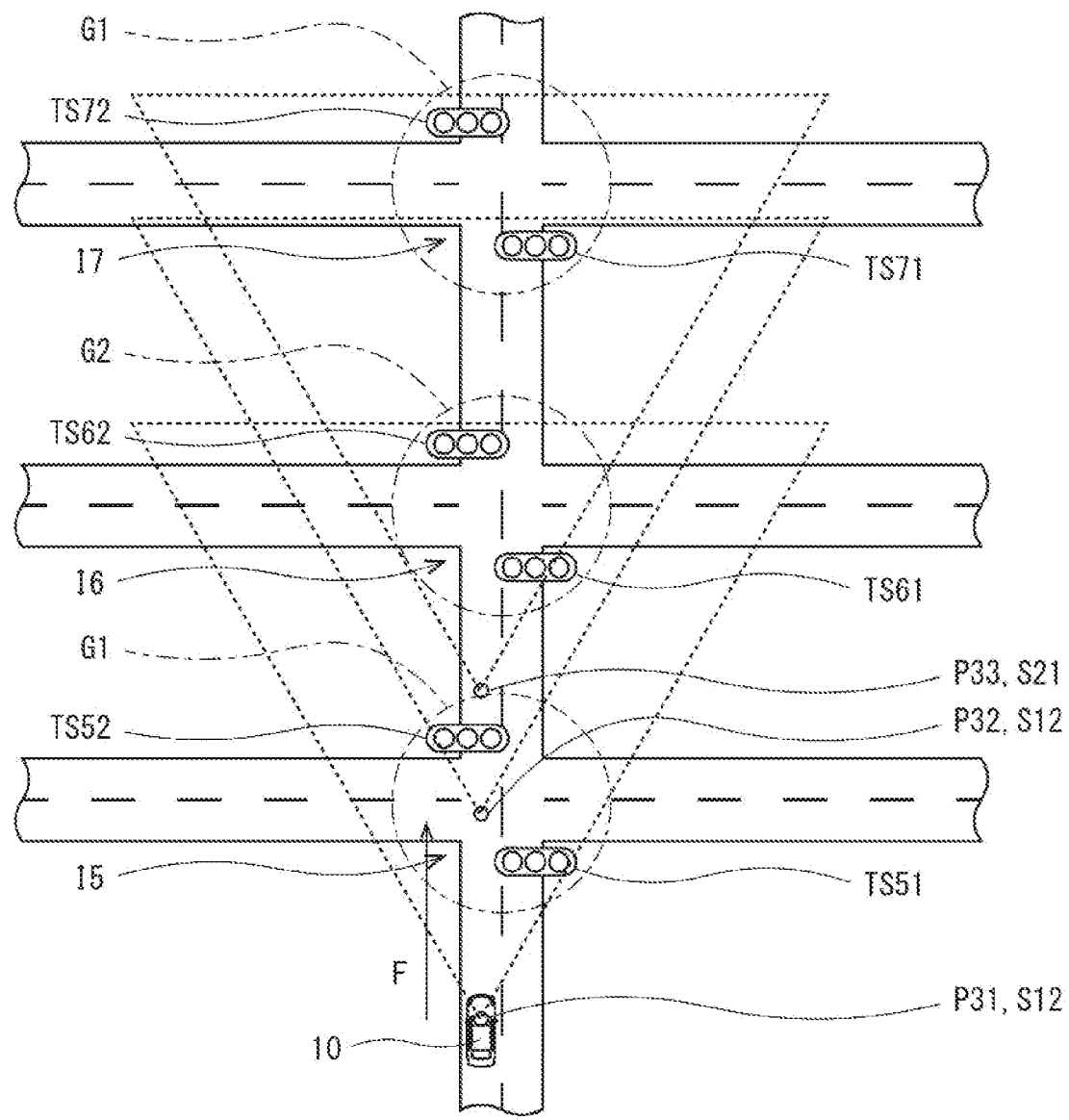
FIG. 5 is an explanatory diagram illustrating still another operation example of the traffic signal detector illustrated in FIG. 1.

FIG. 5 illustrates still another operation example of the traffic signal detector 30. On the traveling road, there are intersections I5 to I7 ahead of the vehicle 10. Two traffic signals TS51 and TS52 are provided at the intersection I5, two traffic signals TS61 and TS62 are provided at the intersection I6, and two traffic signals TS71 and TS72 are provided at the intersection I7.

When the vehicle 10 is at a location P31, the two traffic signals TS51 and TS52 provided at the intersection I5 and the two traffic signals TS61 and TS62 provided at the intersection I6 are included in the imaging range R. In this example, the grouping processor 32 may cause the traffic signals TS51 and TS52 to belong to the group G1, and cause the traffic signals TS61 and TS62 to belong to the group G2. The traffic signals TS51 and TS52 that belong to the group G1 are closer to the vehicle 10 than the traffic signals TS61 and TS62 that belong to the group G2. The management state is thus at S12.

When the vehicle 10 comes to a location P32, the traffic signal TS71 provided at the intersection I7 enters the imaging range R, and the traffic signal TS51 provided at the intersection I5 goes out of the imaging range R. As a result, the imaging range R includes the traffic signal TS52 provided at the intersection I5, the traffic signals TS61 and TS62 provided at the intersection I6, and the traffic signal TS71 provided at the intersection I7. The traffic signals TS51 and TS52 may belong to the group G1, and the traffic signals TS61 and TS62 may belong to the group G2. The traffic signal TS71 is not located at the intersection I5 at which the traffic signal TS52 is provided, and not located at the intersection I6 at which the traffic signals TS61 and TS62 are provided. Thus, the grouping processor 32 may cause the traffic signal TS71 to belong to neither of the groups G1 and G2. The management state S thus remains at S12.

When the vehicle 10 comes to a location P33, the traffic signal TS72 provided at the intersection I7 enters the imaging range R, and the traffic signal TS52 provided at the intersection I5 goes out of the imaging range R. As a result, the imaging range R includes the traffic signals TS61 and TS62 provided at the intersection I6, and the traffic signals TS71 and TS72 provided at the intersection I7. The management unit 33 may exclude the two traffic signals TS51 and TS52 from the group G1 because the vehicle 10 has passed through the location of the traffic signal TS52. This causes the two traffic signals TS51 and TS52 to fall outside the scope of management by the management unit 33. The grouping processor 32 may thereafter cause the traffic signals TS71 and TS72 located at the intersection I7 to belong to the group G1. This results in a state where the traffic signals TS71 and TS72 belong to the group G1 and the traffic signals TS61 and TS62 belong to the group G2. The traffic signals TS61 and TS62 that belong to the group G2 are closer to the vehicle 10 than the traffic signals TS71 and TS72 that belong to the group G1. The management state S thus changes to S21.

As described above, the grouping processor 32 may cause a newly detected traffic signal TS to belong to neither of the groups G1 and G2 in the case where one or more traffic signals TS belong to each of the group G1 and the group G2, where the newly detected traffic signal TS is not located at an intersection at which the one or more traffic signals TS that belong to the group G1 are provided, and where the newly detected traffic signal TS is not located at an intersection at which the one or more traffic signals TS that belong to the group G2 are provided.

FIGS. 6A to 6D illustrate example flowcharts of an operation of the traffic signal detector 30.

The detector 31 of the traffic signal detector 30 may first confirm whether any traffic signal TS has been newly detected (step S101). In a case where no traffic signal TS has been newly detected ("N" in step S102), the process may return to step S101, and the processes of steps S101 and S102 may be repeated until any traffic signal TS is newly detected.

In step S102, in a case where a traffic signal TS has been newly detected ("Y" in step S102), a confirmation may thereafter be made as to whether there is no group G to which any traffic signal TS belongs (step S103). In a case where there is no group G to which any traffic signal TS belongs ("N" in step S103), the grouping processor 32 may cause the newly detected traffic signal TS to belong to either one of the group G1 and the group G2 (step S104). Thereafter, the traffic signal data generator 34 may employ the distance to the detected traffic signal TS as the representative distance D1 of the group G to which the traffic signal TS belongs (step S105), and may employ the display information of the detected traffic signal TS as the representative display information D2 of the group G to which the traffic signal TS belongs (step S106). The process may then end.

In step S103, in a case where there is at least one group G to which one or more traffic signals TS belong ("Y" in step S103), the management unit 33 may confirm whether the group G1 is the only group G to which one or more traffic signals TS belong (step S107).

In step S107, in a case where the group G1 is the only group G to which one or more traffic signals TS belong ("Y" in step S107), the management unit 33 may confirm whether the detected traffic signal TS is located within a predetermined distance (e.g., 60 meters) from the one or more traffic signals TS that belong to the group G1 (step S108). In other words, the management unit 33 may confirm whether the detected traffic signal TS is located at an intersection at which the one or more traffic signals TS that belong to the group G1 are provided. For example, the management unit 33 may confirm whether the detected traffic signal TS is located within a predetermined distance from a location indicated by the representative distance D1 of the group G1. In general, any newly detected traffic signal TS is located farther from the vehicle 10 than the one or more traffic signals TS that belong to the group G1. The representative distance D1 of the group G1 may be, as will be described later, a distance to a traffic signal TS closest to the vehicle 10 among the one or more traffic signals TS that belong to the group G1. Therefore, confirming whether the detected traffic signal TS is located within a predetermined distance from the location indicated by the representative distance D1 of the group G1 makes it possible to confirm whether the detected traffic signal TS is located within the predetermined distance from all of the one or more traffic signals TS that belong to the group G1.

In step S108, in a case where the detected traffic signal TS is located within the predetermined distance from the one or more traffic signals TS that belong to the group G1 ("Y" in step S108), the grouping processor 32 may cause the detected traffic signal TS to belong to the group G1 (step S109). This results in a plurality of traffic signals TS belonging to the group G1. The plurality of traffic signals TS includes the one or more traffic signals TS that already belong to the group G1 and the detected traffic signal TS. The traffic signal data generator 34 may thereafter employ the distance to, among the traffic signals TS that belong to the group G1, one traffic signal TS that is closest to the vehicle 10 as the representative distance D1 of the group G1 (step S110). The traffic signal data generator 34 may thereafter employ the display information of, among the traffic signals TS that belong to the group G1, one traffic signal TS that is closest to the vehicle 10 and whose image is included in the captured images (the left images PL0 and PL and the right images PR0 and PR) as the representative display information D2 of the group G1 (step S111). The process may then end.

In step S108, in a case where the detected traffic signal TS is not located within the predetermined distance from the one or more traffic signals TS that belong to the group G1 ("N" in step S108), the grouping processor 32 may cause the detected traffic signal TS to belong to the group G2 (step S112). This results in one traffic signal TS belonging to the group G2. More specifically, because it has been confirmed that the group G1 is the only group G to which one or more traffic signals TS belong ("Y" in step S107) and no traffic signal TS belongs to the group G2, the grouping processor 32 may cause the detected traffic signal TS to belong to the group G2 in this step S112, thereby providing the group G2 with one traffic signal TS belonging thereto. The traffic signal data generator 34 may employ the distance to the detected traffic signal TS as the representative distance D1 of the group G2 (step S113), and employ the display information of the detected traffic signal TS as the representative display information D2 of the group G2 (step S114). The process may then end.

In step S107, in a case where the group G1 is not the only group G to which one or more traffic signals TS belong ("N" in step S107), the management unit 33 may confirm whether the group G2 is the only group G to which one or more traffic signals TS belong (step S115).

In step S115, in a case where the group G2 is the only group G to which one or more traffic signals TS belong ("Y" in step S115), the management unit 33 may confirm whether the detected traffic signal TS is located within a predetermined distance (e.g., 60 meters) from the one or more traffic signals TS that belong to the group G2 (step S116). For example, the management unit 33 may confirm whether the detected traffic signal TS is located within a predetermined distance from the location indicated by the representative distance D1 of the group G2.

In step S116, in a case where the detected traffic signal TS is located within the predetermined distance from the one or more traffic signals TS that belong to the group G2 ("Y" in step S116), the grouping processor 32 may cause the detected traffic signal TS to belong to the group G2 (step S117). This results in a plurality of traffic signals TS belonging to the group G2. The plurality of traffic signals TS includes the one or more traffic signals TS that already belong to the group G2 and the detected traffic signal TS. The traffic signal data generator 34 may thereafter employ the distance to, among the traffic signals TS that belong to the group G2, one traffic signal TS that is closest to the vehicle 10 as the representative distance D1 of the group G2 (step S118). The traffic signal data generator 34 may thereafter employ the display information of, among the traffic signals TS that belong to the group G2, one traffic signal TS that is closest to the vehicle 10 and whose image is included in the captured images (the left images PL0 and PL and the right images PR0 and PR) as the representative display information D2 of the group G2 (step S119). The process may then end.

In step S116, in a case where the detected traffic signal TS is not located within the predetermined distance from the one or more traffic signals TS that belong to the group G2 ("N" in step S116), the grouping processor 32 may cause the detected traffic signal TS to belong to the group G1 (step S120). This results in one traffic signal TS belonging to the group G1. More specifically, because it has been confirmed that the group G2 is the only group G to which one or more traffic signals TS belong ("Y" in step S115) and no traffic signal TS belongs to the group G1, the grouping processor 32 may cause the detected traffic signal TS to belong to the group G1 in this step S120, thereby providing the group G1 with one traffic signal TS belonging thereto. The traffic signal data generator 34 may employ the distance to the detected traffic signal TS as the representative distance D1 of the group G1 (step S121), and employ the display information of the detected traffic signal TS as the representative display information D2 of the group G1 (step S122). The process may then end.

In step S115, in a case where the group G2 is not the only group G to which one or more traffic signals TS belong ("N" in step S115), the management unit 33 may confirm whether the one or more traffic signals TS that belong to the group G1 are closer to the vehicle 10 than the one or more traffic signals TS that belong to the group G2 (step S123). More specifically, it has been confirmed that: there is at least one group G to which one or more traffic signals TS belong ("Y" in step S103); the group G1 is not the only group G to which one or more traffic signals TS belong ("N" in step S107); and the group G2 is not the only group G to which one or more traffic signals TS belong ("N" in step S115). It follows that one or more traffic signals TS belong to each of the group G1 and the group G2. The management unit 33 may thus confirm whether the one or more traffic signals TS that belong to the group G1 are closer to the vehicle 10 than the one or more traffic signals TS that belong to the group G2.

In step S123, in a case where the one or more traffic signals TS that belong to the group G1 are closer to the vehicle 10 than the one or more traffic signals TS that belong to the group G2 ("Y" in step S123), the management unit 33 may confirm whether the detected traffic signal TS is located within a predetermined distance (e.g., 60 meters) from the one or more traffic signals TS that belong to the group G2 (step S124). For example, the management unit 33 may confirm whether the detected traffic signal TS is located within the predetermined distance from the location indicated by the representative distance D1 of the group G2.

In step S124, in a case where the detected traffic signal TS is located within the predetermined distance from the one or more traffic signals TS that belong to the group G2 ("Y" in step S124), the grouping processor 32 may cause the detected traffic signal TS to belong to the group G2 (step S125). This results in a plurality of traffic signals TS belonging to the group G2. The plurality of traffic signals TS includes the one or more traffic signals TS that already belong to the group G2 and the detected traffic signal TS. The traffic signal data generator 34 may thereafter employ the distance to, among the traffic signals TS that belong to the group G2, one traffic signal TS that is closest to the vehicle 10 as the representative distance D1 of the group G2 (step S126). The traffic signal data generator 34 may thereafter employ the display information of, among the traffic signals TS that belong to the group G2, one traffic signal TS that is closest to the vehicle 10 and whose image is included in the captured images (the left images PL0 and PL and the right images PR0 and PR) as the representative display information D2 of the group G2 (step S127). The process may then end.

In step S124, in a case where the detected traffic signal TS is not located within the predetermined distance from the one or more traffic signals TS that belong to the group G2 ("N" in step S124), the process may end. More specifically, in this case, the detected traffic signal TS is not located at the intersection corresponding to the group G2. Further, in general, any newly detected traffic signal TS is located farther from the vehicle 10 than the one or more traffic signals TS that belong to the group G2. It follows that the detected traffic signal TS is not located at the intersection corresponding to the group G1 that is closer to the vehicle 10 than the intersection corresponding to the group G2. Thus, the grouping processor 32 may cause the detected traffic signal TS to belong to neither of the groups G1 and G2, thereby causing the process to end.

In step S123, in a case where the one or more traffic signals TS that belong to the group G1 are farther from the vehicle 10 than the one or more traffic signals TS that belong to the group G2 ("N" in step S123), the management unit 33 may confirm whether the detected traffic signal TS is located within a predetermined distance (e.g., 60 meters) from the one or more traffic signals TS that belong to the group G1 (step S128). For example, the management unit 33 may confirm whether the detected traffic signal TS is located within the predetermined distance from the location indicated by the representative distance D1 of the group G1.

In step S128, in a case where the detected traffic signal TS is located within the predetermined distance from the one or more traffic signals TS that belong to the group G1 ("Y" in step S128), the grouping processor 32 may cause the detected traffic signal TS to belong to the group G1 (step S129). This results in a plurality of traffic signals TS belonging to the group G1. The plurality of traffic signals TS includes the one or more traffic signals TS that already belong to the group G1 and the detected traffic signal TS. The traffic signal data generator 34 may thereafter employ the distance to, among the traffic signals TS that belong to the group G1, one traffic signal TS that is closest to the vehicle 10 as the representative distance D1 of the group G1 (step S130). The traffic signal data generator 34 may thereafter employ the display information of, among the traffic signals TS that belong to the group G1, one traffic signal TS that is closest to the vehicle 10 and whose image is included in the captured images (the left images PL0 and PL and the right images PR0 and PR) as the representative display information D2 of the group G1 (step S131). The process may then end.

In step S128, in a case where the detected traffic signal TS is not located within the predetermined distance from the one or more traffic signals TS that belong to the group G1 ("N" in step S128), the process may end. More specifically, in this case, the detected traffic signal TS is not located at the intersection corresponding to the group G1. Further, in general, any newly detected traffic signal TS is located farther from the vehicle 10 than the one or more traffic signals TS that belong to the group G1. It follows that the detected traffic signal TS is not located at the intersection corresponding to the group G2 that is closer to the vehicle 10 than the intersection corresponding to the group G1. Thus, the grouping processor 32 may cause the detected traffic signal TS to belong to neither of the groups G1 and G2, thereby causing the process to end.

In such a manner, in the image processing apparatus 1, a plurality of traffic signals TS is managed by performing the grouping process of causing a traffic signal TS detected by the detector 31 to belong to any one of a plurality of groups G (in this example, two groups G1 and G2) and managing the location and the display information of the traffic signal TS detected by the detector 31 in association with the group G to which the traffic signal TS belongs. Then, for each of the groups G, the representative location (the representative distance D1) and the representative display information D2 of one or more traffic signals TS that belong to relevant one of the groups G are determined on the basis of the location and the display information of each of the one or more traffic signals TS that belong to the relevant one of the groups G. The image processing apparatus 1 is thus able to cause, for example, two or more traffic signals TS that are located at one intersection to belong to one group G. This makes it possible to appropriately obtain the display information of a plurality of traffic signals TS.

For example, in a case where the grouping process is not performed, an image processing apparatus is able to obtain a location and display information of, among a plurality of traffic signals TS detected, one traffic signal TS (hereinafter referred to as a traffic signal TS1) that is closest to the vehicle 10. In such a case, the vehicle 10 is able to provide the driver with the information related to this closest traffic signal TS1. However, when the vehicle 10 has passed through this closest traffic signal TS1, the image processing apparatus obtains a location and display information of a next traffic signal TS (hereinafter referred to as a traffic signal TS2), and then the vehicle 10 provides the driver with the information related to the traffic signal TS2. For example, assume that the traffic signal TS1 and the traffic signal TS2 are not very far away from each other, and that the traffic signal TS1 is at green whereas the traffic signal TS2 is at red. In such a case, the vehicle 10 informs the driver that the traffic signal TS2 is at red immediately after passing through the traffic signal TS1. This can make the driver feel rushed. Further, in a case of performing a braking control, the vehicle 10 performs the braking control immediately after passing through the traffic signal TS1. This can result in sudden braking.

In contrast, the image processing apparatus 1 according to the present example embodiment performs the grouping process of causing a detected traffic signal TS to belong to any one of a plurality of groups G, and manages the location and the display information of the detected traffic signal TS in association with the group G to which the traffic signal TS belongs. The image processing apparatus 1 thereafter determines the representative location (the representative distance D1) and the representative display information D2 for each of the groups G. The image processing apparatus 1 thereby makes it possible to appropriately obtain the display information of a plurality of traffic signals TS. For example, in the case where the traffic signal TS1 and the traffic signal TS2 are not very far away from each other and where the traffic signal TS1 is at green whereas the traffic signal TS2 is at red, it is possible for the vehicle 10 to inform the driver that the traffic signal TS1 closer to the vehicle 10 is at green and the traffic signal TS2 farther from the vehicle 10 is at red. The driver is thereby able to capture information on a traffic signal TS ahead of the vehicle 10 in good time. Further, in the case of performing a braking control, it is possible for the vehicle 10 to start the braking control in good time before passing through the traffic signal TS1, for example.

Figure 6A:
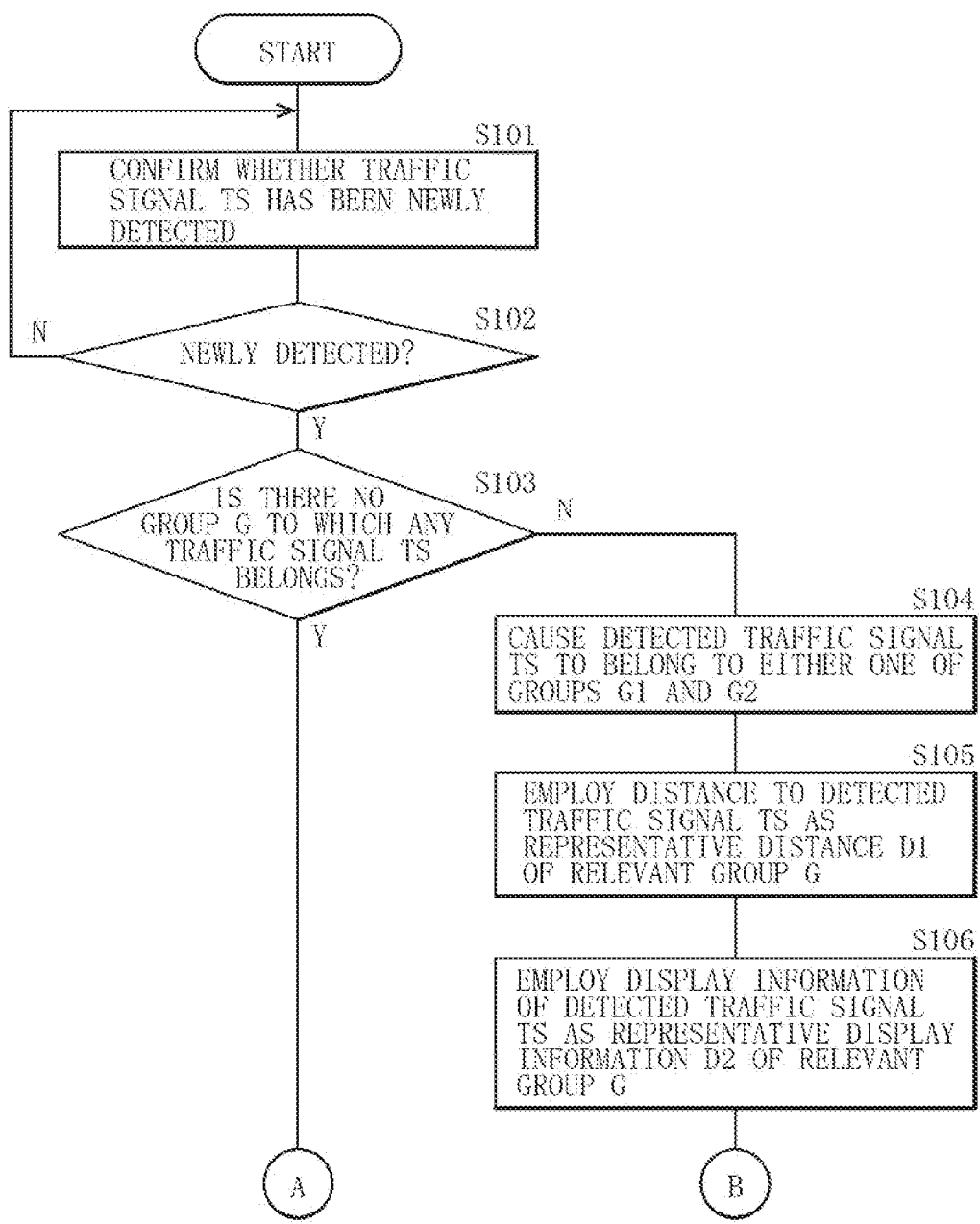
FIG. 6A is a flowchart of an operation example of the traffic signal detector illustrated in FIG. 1.
Figure 6B:
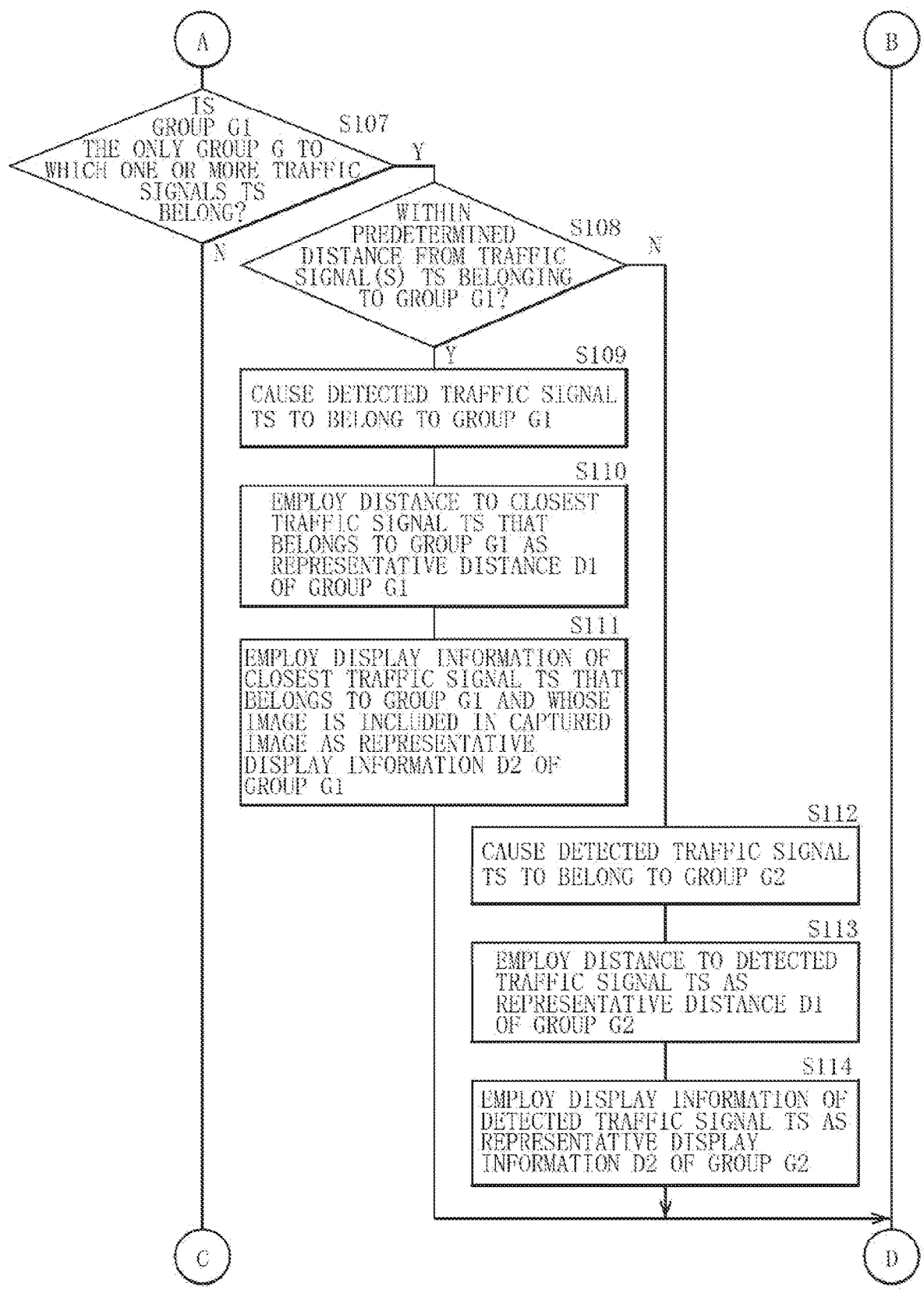
FIG. 6B is another flowchart of an operation example of the traffic signal detector illustrated in FIG. 1.
Figure 6C:
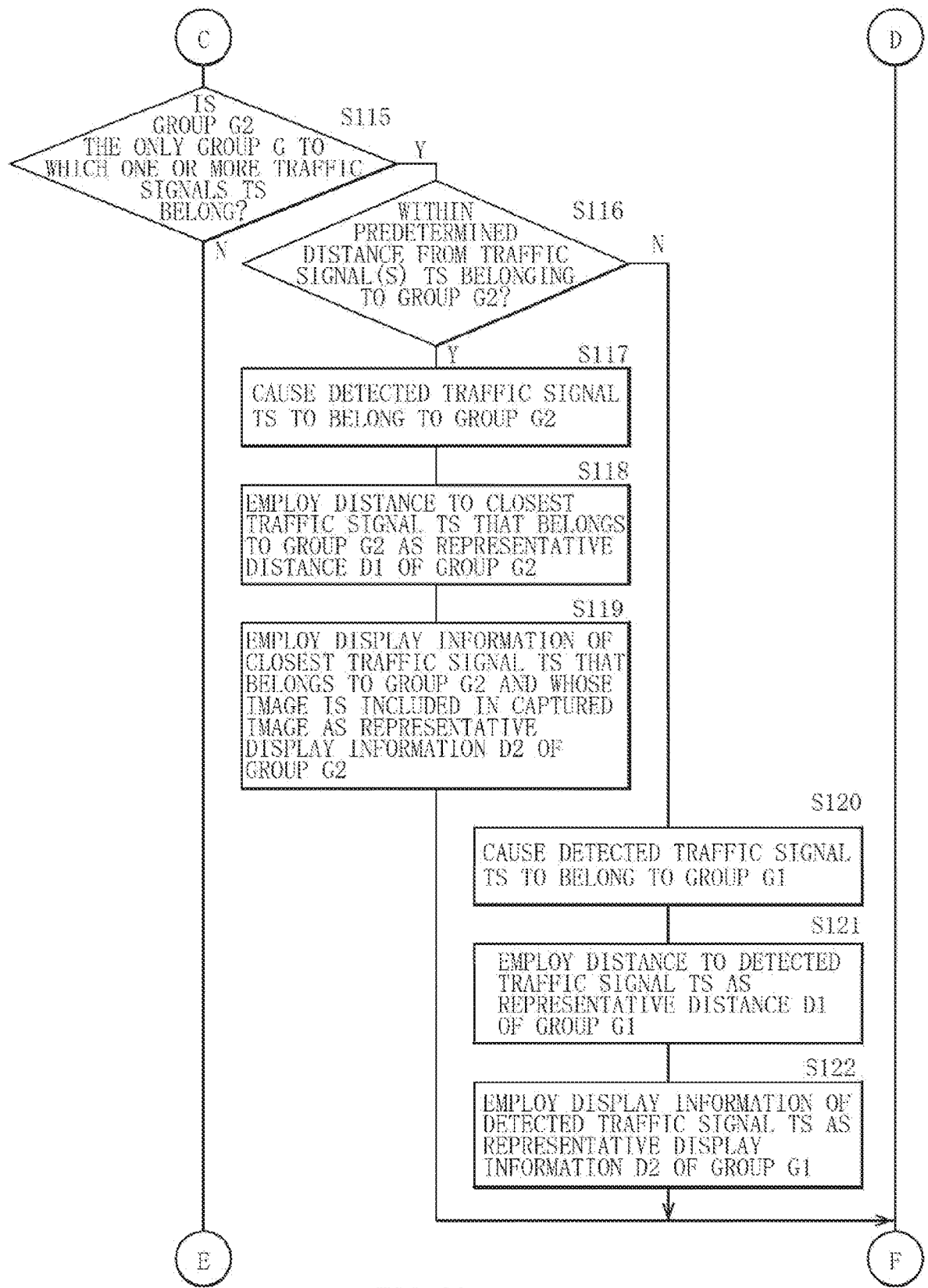
FIG. 6C is still another flowchart of an operation example of the traffic signal detector illustrated in FIG. 1.
Figure 6D:
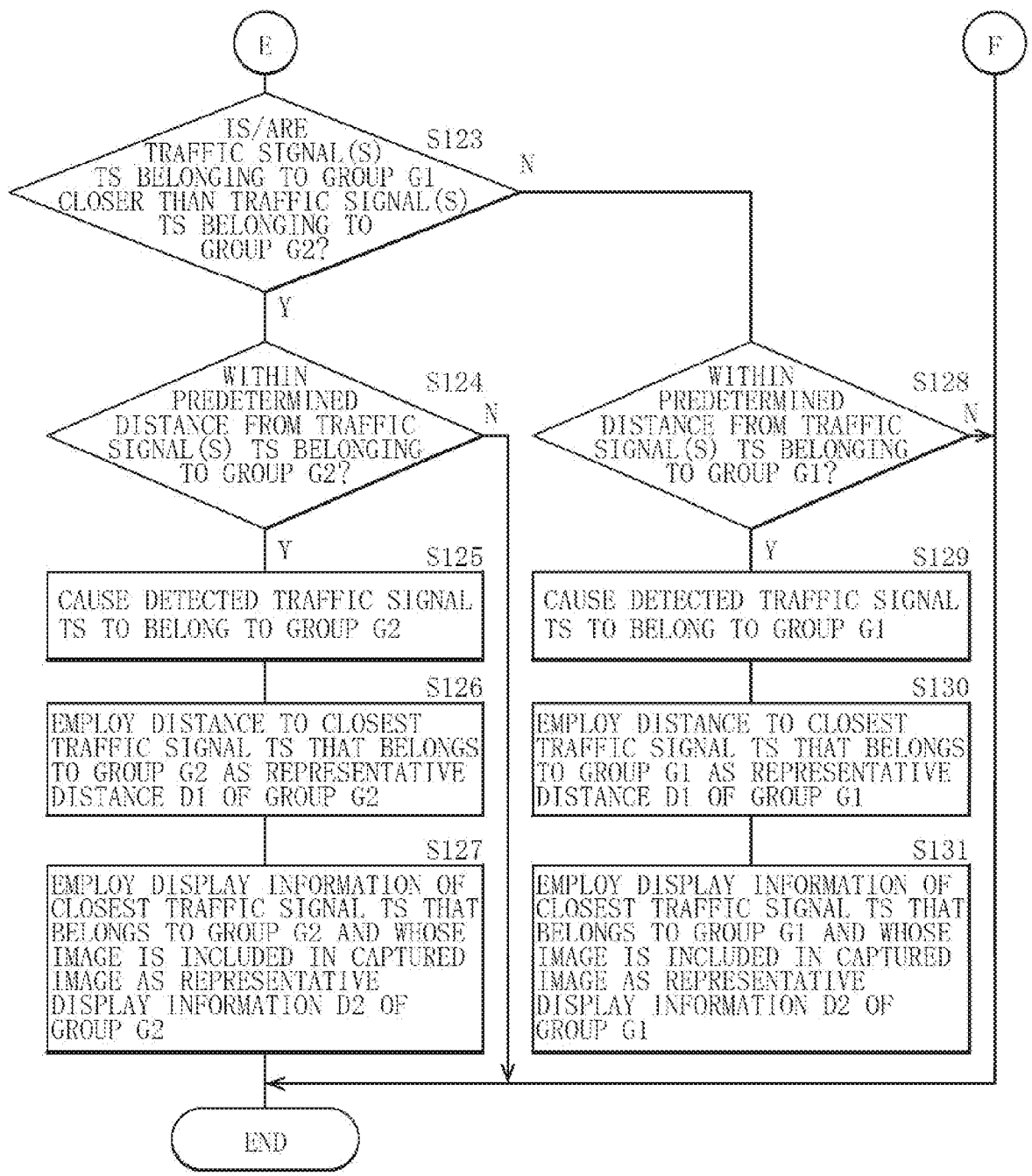
FIG. 6D is yet still another flowchart of an operation example of the traffic signal detector illustrated in FIG. 1.

According to the image processing apparatus 1, as described in steps S115, S116, and S120 in FIG. 6C, in a case where no traffic signal TS belongs to a first group (e.g., the group G1) of the plurality of groups G, where one or more traffic signals TS belong to each of one or more groups of the plurality of groups G other than the first group (e.g., the group G2), and where a traffic signal TS detected by the detector 31 is at a location beyond a predetermined distance from the locations of the one or more traffic signals TS that belong to each of the one or more groups of the plurality of groups G other than the first group (e.g., the group G2), the traffic signal TS detected by the detector 31 may be caused to belong to the first group (e.g., the group G1). The image processing apparatus 1 is thus able to cause, for example, traffic signals TS that are located at different intersections to belong to different groups G. This makes it possible to appropriately obtain the display information of a plurality of traffic signals TS.

Further, according to the image processing apparatus 1, as described in steps S116 and S117 in FIG. 6C, in a case where the location of the traffic signal TS detected by the detector 31 is within a predetermined distance from the locations of one or more traffic signals TS that belong to a second group (e.g., the group G2) of the plurality of groups G, the traffic signal TS detected by the detector 31 may be caused to belong to the second group (e.g., the group G2). In other words, in a case where the traffic signal TS detected by the detector 31 is located at an intersection at which the one or more traffic signals TS that belong to the second group (e.g., the group G2) of the plurality of groups G are provided, the traffic signal TS detected by the detector 31 may be caused to belong to the second group (e.g., the group G2). In such a manner, the image processing apparatus 1 is able to cause, for example, two or more traffic signals TS that are located at the same intersection to belong to one group G. This makes it possible to appropriately obtain the display information of a plurality of traffic signals TS.

Further, according to the image processing apparatus 1, the traffic signal detector 30 may detect a traffic signal TS on the basis of the left image PL0 and the right image PR0 in addition to the left image PL and the right image PR. The left image PL0 and the right image PR0 may be Bayer images. This makes it possible for the image processing apparatus 1 to obtain the display information of a traffic signal TS closer to the vehicle 10 as compared with a case of using neither of the left image PL0 and the right image PR0. Accordingly, the image processing apparatus 1 is able to detect traffic signals TS provided over an extensive region ahead of the vehicle 10 ranging from a location close to the vehicle 10 to a location far from the vehicle 10. As a result, the image processing apparatus 1 makes it possible to appropriately obtain the display information of a plurality of traffic signals TS.

As described above, according to the present example embodiment, a plurality of traffic signals is managed by performing the grouping process of causing a traffic signal detected by the detector to belong to one of a plurality of groups and managing the location and the display information of the traffic signal detected by the detector in association with the group to which the traffic signal belongs. For each of the plurality of groups, the representative location and the representative display information of one or more traffic signals that belong to relevant one of the plurality of groups are determined on the basis of the location and the display information of each of the one or more traffic signals that belong to the relevant one of the plurality of groups.

This makes it possible to appropriately obtain the display information of a plurality of traffic signals.

Figure 7:
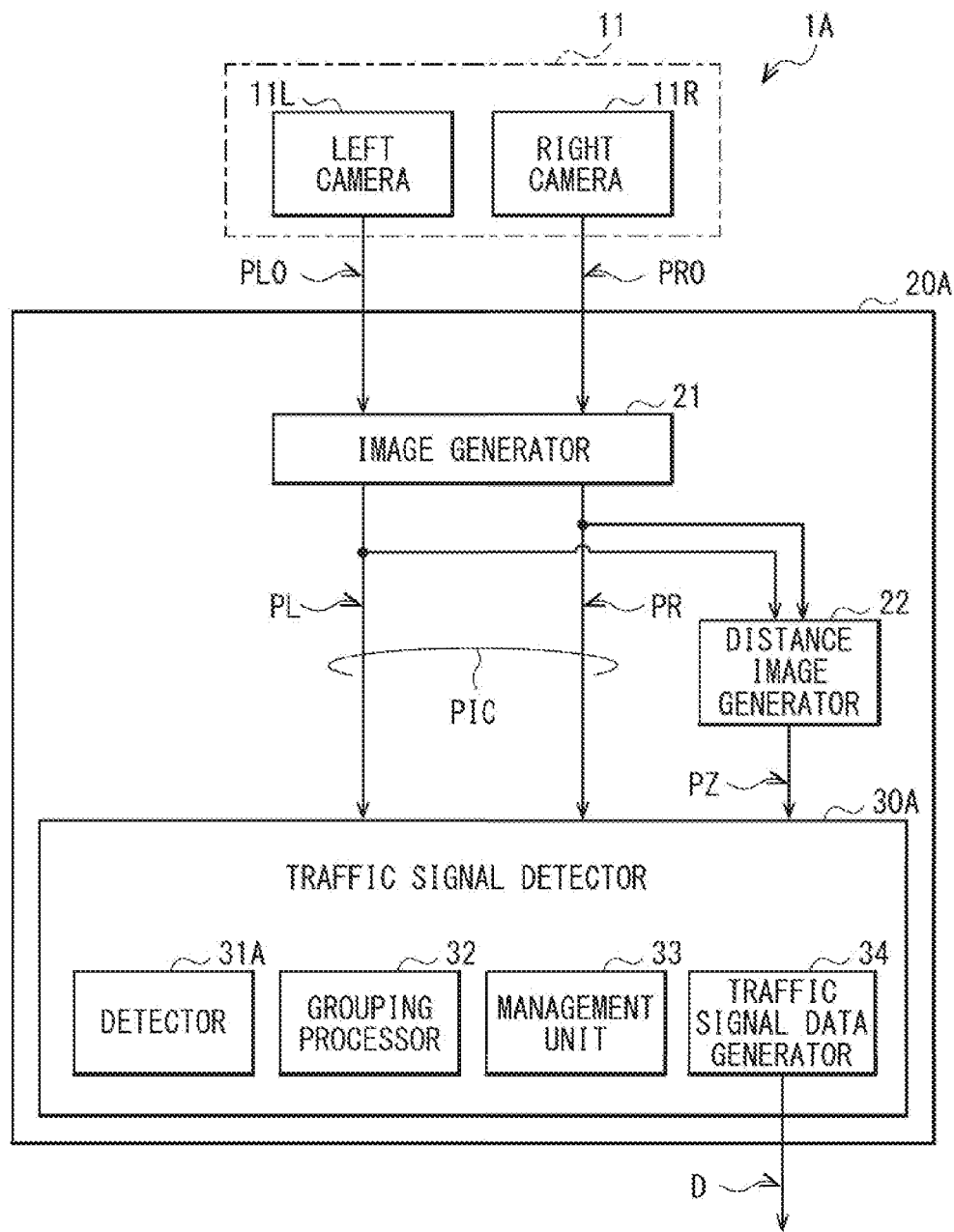
FIG. 7 is a block diagram illustrating a configuration example of an image processing apparatus according to one modification example.

In the example embodiment described above, the traffic signal detector 30 may detect a traffic signal TS on the basis of the left images PL0 and PL, the right images PR0 and PR, and the distance image PZ; however, this is non-limiting. Alternatively, for example, the traffic signal TS may be detected on the basis of the left image PL, the right image PR, and the distance image PZ, as in an image processing apparatus 1A illustrated in FIG. 7. The image processing apparatus 1A may include a processor 20A. The processor 20A may include a traffic signal detector 30A. The traffic signal detector 30A may detect a traffic signal TS on the basis of the left image PL, the right image PR, and the distance image PZ to thereby generate the traffic signal data D. The traffic signal detector 30A may include a detector 31A.

The detector 31A may, on the basis of the left image PL and the right image PR, for example, recognize a traffic signal TS and obtain the display information of the traffic signal TS. The detector 31A may thereafter obtain a distance to the traffic signal TS on the basis of the distance image PZ.

Thereafter, for example, when the image of the traffic signal TS goes out of the left image PL and the right image PR due to traveling of the vehicle 10, the detector 31A may estimate a distance to the traffic signal TS on the basis of the previously obtained distance to the traffic signal TS and data related to the traveling speed of the vehicle 10.

In the example embodiment described above, the management unit 33 may exclude one or more traffic signals TS provided at one intersection from the group G in the case where, for example, the vehicle 10 has passed through the locations of all of the one or more traffic signals TS; however, this is non-limiting. Alternatively, for example, one or more traffic signals TS may be excluded from the group G in a case where all the images of the one or more traffic signals TS have gone out of the captured images (the left images PL0 and PL and the right images PR0 and PR).

Two or more of the modification examples described above may be employed in combination.

Although the technology has been described with reference to the example embodiment and modification examples thereof, the technology is not limited thereto, and may be modified in a variety of ways.

For example, in the example embodiment described above, two groups G may be provided; however, this is non-limiting. Alternatively, for example, three or more groups G may be provided.

According to the image processing apparatus and the image processing method of at least one embodiment of the technology, it is possible to appropriately obtain the display information of a plurality of traffic signals.

It should be appreciated that the effects described herein are mere illustrative and non-limiting, and other effects may be made.

The processor 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the processor 20 illustrated in FIG. 1.

The invention claimed is:

1. An image processing apparatus comprising:
   a detector configured to detect traffic signals on a basis of a captured image;
   a grouping processor configured to perform a grouping process of causing each of the traffic signals detected by the detector to belong to a respective group of a plurality of groups, each respective group corresponding to a respective intersection of a plurality of intersections;
   a management unit configured to manage a location and display information of the each of the traffic signals detected by the detector in respectively associated with the respective group of the plurality of groups to which the each of the traffic signals belongs, and to thereby manage the traffic signals; and
   a determination unit configured to determine, for each respective group of the plurality of groups, a representative location and representative display information of one or more traffic signals that belong to a relevant group of the plurality of groups, among the traffic signals, on a basis of the location and the display information of each of the one or more traffic signals which belong to the relevant group of the plurality of groups.

2. The image processing apparatus according to claim 1, wherein, in a case where none of the traffic signals belongs to a first group of the plurality of groups, where one or more traffic signals of the traffic signals respectively belong to one or more groups of the plurality of groups other than the first group, and where a location of one traffic signal of the traffic signals detected by the detector is beyond a predetermined distance from the location of each of the one or more traffic signals that respectively belong to the one or more groups of the groups other than the first group, the grouping processor is configured to cause the one traffic signal to belong to the first group.

3. The image processing apparatus according to claim 2, wherein the grouping processor is configured to cause the one traffic signal to belong to a second group of the plurality of groups in a case where the one traffic signal is located at an intersection of the plurality of intersections at which, among the traffic signals, one or more traffic signals that belong to the second group are provided.

4. The image processing apparatus according to claim 3, wherein the grouping processor is configured to refrain from performing the grouping process, in a case where one or more traffic signals of the traffic signals respectively belong to each group of the plurality of groups and where the location of one traffic signal of the traffic signals detected by the detector is beyond a predetermined distance from the location of each of the one or more traffic signals that respectively belong to each group of the plurality of groups.

5. The image processing apparatus according to claim 3, wherein
   the image processing apparatus is mountable on a vehicle, and the management unit is configured to exclude, from a third group of the plurality of groups, one or more traffic signals that belong to the third group, among the traffic signals, in a case where the vehicle has passed through locations of the one or more traffic signals that belong to the third group.

6. The image processing apparatus according to claim 2, wherein the grouping processor is configured to cause the one traffic signal to belong to a second group of the plurality of groups in a case where the location of the one traffic signal is within the predetermined distance from the location of each of one or more traffic signals that belong to the second group among the traffic signals.

7. The image processing apparatus according to claim 6, wherein the grouping processor is configured to refrain from performing the grouping process, in a case where one or more traffic signals of the traffic signals respectively belong to each group of the plurality of groups and where the location of one traffic signal of the traffic signals detected by the detector is beyond a predetermined distance from the location of each of the one or more traffic signals that respectively belong to each group of the plurality of groups.

8. The image processing apparatus according to claim 6, wherein
the image processing apparatus is mountable on a vehicle, and
the management unit is configured to exclude, from a third group of the plurality of groups, one or more traffic signals that belong to the third group, among the traffic signals, in a case where the vehicle has passed through locations of the one or more traffic signals that belong to the third group.

9. The image processing apparatus according to claim 2, wherein the grouping processor is configured to refrain from performing the grouping process, in a case where one or more traffic signals of the traffic signals respectively belong to each group of the plurality of groups and where the location of one traffic signal of the traffic signals detected by the detector is beyond a predetermined distance from the location of each of the one or more traffic signals that respectively belong to each group of the plurality of groups.

10. The image processing apparatus according to claim 2, wherein
the image processing apparatus is mountable on a vehicle, and
the management unit is configured to exclude, from a second group of the plurality of groups, one or more traffic signals that belong to the second group, among the traffic signals, in a case where the vehicle has passed through locations of the one or more traffic signals that belong to the second group.

11. The image processing apparatus according to claim 1, wherein the grouping processor is configured to cause one traffic signal of the traffic signals detected by the detector to belong to a first group of the plurality of groups in a case where the one traffic signal is located at an intersection of the plurality of intersections at which, among the traffic signals, one or more traffic signals that belong to the first group are provided.

12. The image processing apparatus according to claim 11, wherein the grouping processor is configured to refrain from performing the grouping process, in a case where one or more traffic signals of the traffic signals respectively belong to each group of the plurality of groups and where the location of one traffic signal of the traffic signals detected by the detector is beyond a predetermined distance from the location of each of the one or more traffic signals that respectively belong to each group of the plurality of groups.

13. The image processing apparatus according to claim 11, wherein
the image processing apparatus is mountable on a vehicle, and
the management unit is configured to exclude, from a second group of the plurality of groups, one or more traffic signals that belong to the second group, among the traffic signals, in a case where the vehicle has passed through locations of the one or more traffic signals that belong to the second group.

14. The image processing apparatus according to claim 1, wherein the grouping processor is configured to cause one traffic signal of the traffic signals detected by the detector to belong to a first group of the plurality of groups in a case where the location of the one traffic signal is within a predetermined distance from the location of each of one or more traffic signals that belong to the first group among the traffic signals.

15. The image processing apparatus according to claim 14, wherein the grouping processor is configured to refrain from performing the grouping process, in a case where one or more traffic signals of the traffic signals respectively belong to each group of the plurality of groups and where the location of one traffic signal of the traffic signals detected by the detector is beyond a predetermined distance from the location of each of the one or more traffic signals that respectively belong to each group of the plurality of groups.

16. The image processing apparatus according to claim 14, wherein
the image processing apparatus is mountable on a vehicle, and
the management unit is configured to exclude, from a second group of the plurality of groups, one or more traffic signals that belong to the second group, among the traffic signals, in a case where the vehicle has passed through locations of the one or more traffic signals that belong to the second group.

17. The image processing apparatus according to claim 1, wherein the grouping processor is configured to refrain from performing the grouping process, in a case where one or more traffic signals of the traffic signals respectively belong to each group of the plurality of groups and where the location of one traffic signal of the traffic signals detected by the detector is beyond a predetermined distance from the location of each of the one or more traffic signals that respectively belong to each group of the plurality of groups.

18. The image processing apparatus according to claim 1, wherein
the image processing apparatus is mountable on a vehicle, and
the management unit is configured to exclude, from a first group of the plurality of groups, one or more traffic signals that belong to the first group, among the traffic signals, in a case where the vehicle has passed through locations of the one or more traffic signals that belong to the first group.

19. An image processing method comprising:
detecting traffic signals on a basis of a captured image;
performing a grouping process of causing each of the traffic signals detected to belong to a respective group of a plurality of groups, each respective group corresponding to a respective intersection of a plurality of intersections;
managing the traffic signals, by managing a location and display information of the each of the traffic signals detected respectively associated with respective group of the plurality of groups to which the each of the traffic signals belongs; and determining, for each respective group of the plurality of groups, a representative location and representative display information of one or more traffic signals that belong to a relevant group of the plurality of groups, among the traffic signals, on a basis of the location and the display information of each of the one or more traffic signals which belong to the relevant group of the plurality of groups.

20. An image processing apparatus comprising circuitry configured to detect traffic signals on a basis of a captured image;

perform a grouping process of causing each of the traffic signals detected to belong to a respective group of a plurality of groups, each respective group corresponding to a respective intersection of a plurality of intersections;

manage the traffic signals, by managing a location and display information of the each of the traffic signals detected respectively associated with the respective group of the plurality of groups to which the each of the traffic signal belongs; and determine, for each respective group of the plurality of groups, a representative location and representative display information of one or more traffic signals that belong to a relevant group of the plurality of groups, among the traffic signals, on a basis of the location and the display information of each of the one or more traffic signals which belong to the relevant group of the plurality of groups.

* * * * *